Nov. 28, 1933.   J. R. McWANE   1,937,239
WELDED PIPE JOINT
Filed Feb. 9, 1931   2 Sheets-Sheet 1
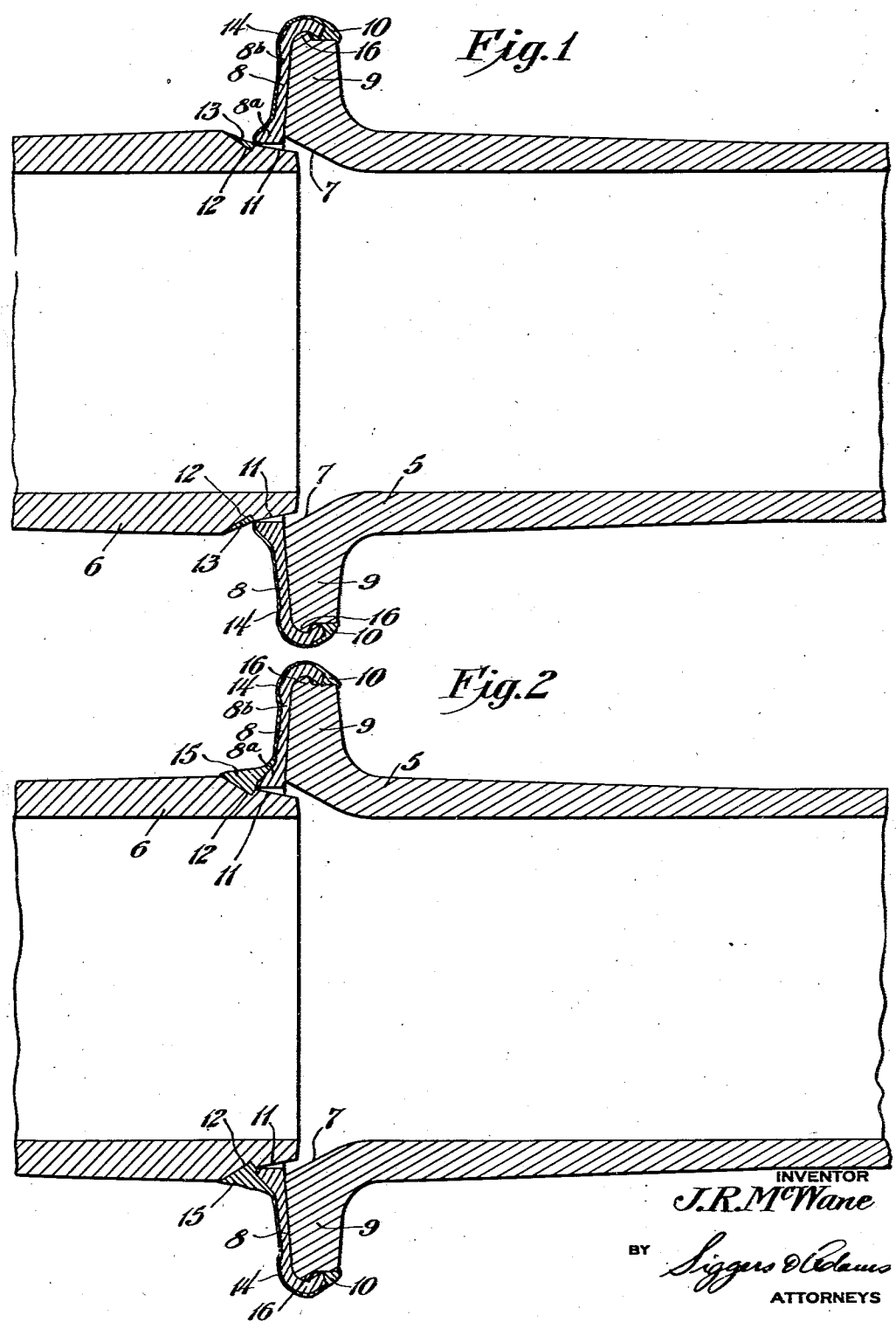
INVENTOR
J. R. McWane
BY
Siggers & Adams
ATTORNEYS Nov. 28, 1933.  J. R. McWANE  1,937,239
WELDED PIPE JOINT
Filed Feb. 9, 1931    2 Sheets-Sheet 2
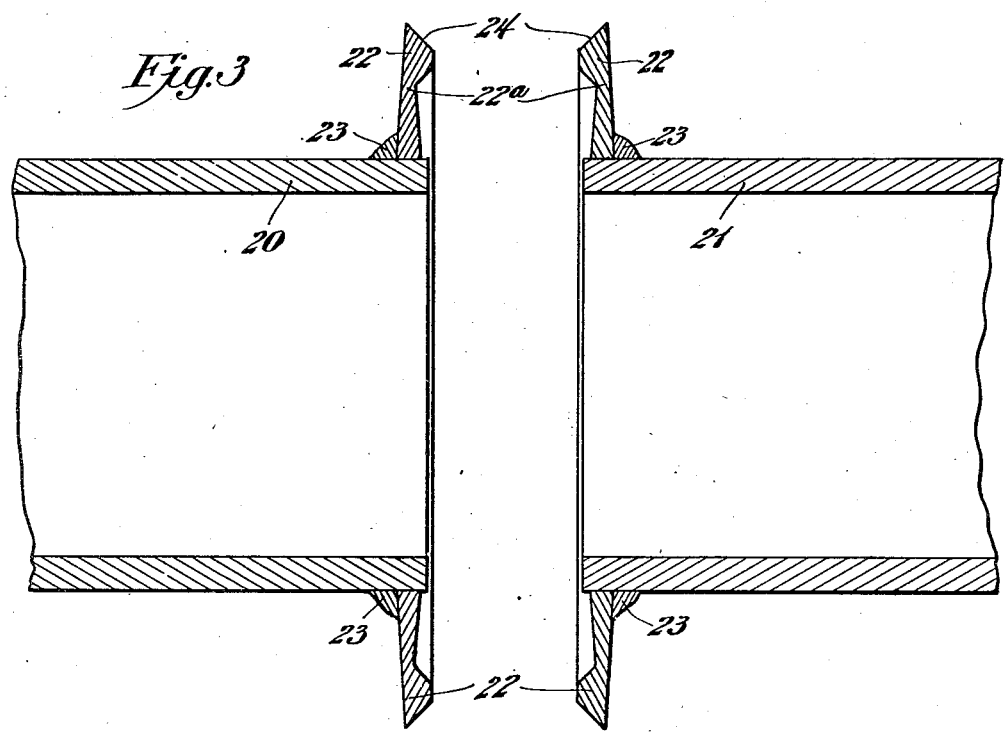
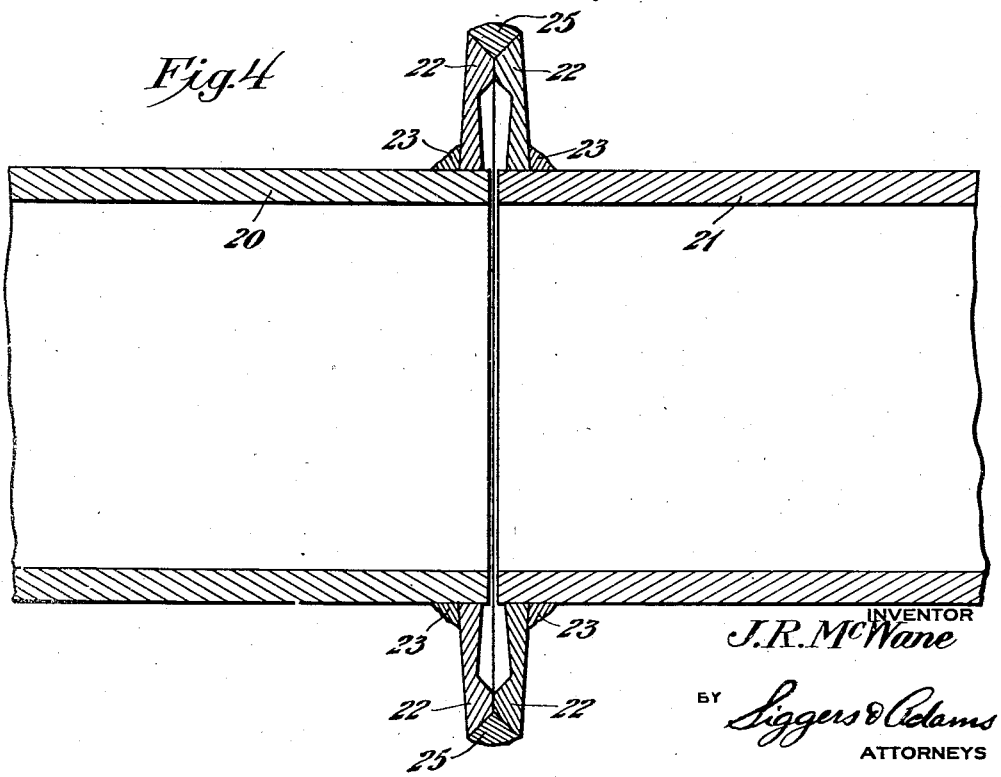

Patented Nov. 28, 1933

1,937,239

UNITED STATES PATENT OFFICE 1,937,239

WELDED PIPE JOINT

James R. McWane, Birmingham, Ala., assignor to McWane Cast Iron Pipe Company, Birmingham, Ala., a corporation of Alabama Application February 9, 1931. Serial No. 514,685

6 Claims. (Cl. 285—111)

This invention relates to welded pipe joints of the type which is especially adapted for bell and spigot cast iron pipe, and it aims generally to improve the welded pipe joint shown in Figs. 3, 4, 5 and 6 of the drawings of my companion application, Serial No. 514,684, filed Feb. 9, 1931, providing a pipe joint having some of the characteristics of an expansion joint.

In accordance with the invention, and as disclosed in the companion application, a pipe section or bell having a radial, outwardly projecting flange is provided, and a resilient metallic ring is welded along its outer edge to the flange of the bell, this welding preferably being done at the factory, in one form of the invention. The spigot is of less diameter at its end than the inner edge of the ring, so that it may be introduced into the bell and be surrounded by the ring. A weld, which is made in the field, may then unite the inner edge of the ring to the spigot.

The present invention provides a ring whose thickness is graduated and is least between its inner and outer edges, and whose outer edge is curled or crimped over the periphery of the bell flange, while the latter is preferably beaded to provide an interlocking connection with the ring. The invention has other aspects and advantages which will be described hereafter.

In the accompanying drawings showing two practical embodiments of the invention,—

Fig. 1 is a longitudinal sectional view showing the improved bell and spigot pipe joint before the field weld is made;

Fig. 2 is a similar view showing the completed pipe joint;

Fig. 3 is a longitudinal sectional view showing a modification, before the final welding; and Fig. 4 is a similar view showing the modified pipe joint completely welded.

Referring particularly to the drawings, and first to Figs. 1 and 2, there is shown a pipe joint of the bell and spigot type but having some of the characteristics of an expansion joint. In this instance, the bell 5 has a shallow recess to receive the spigot 6, said recess being provided by an outward flare 7 at the inner wall of the bell adjacent its end. To unite the bell and spigot together, a resilient metallic ring 8 is welded to both pipe sections in such a maner as to permit relative movement between said sections, the movement permitted being not only longitudinal responsive to thermal expansion and contraction, but also lateral deflection of the pipe sections arising from settling of the earth or other causes. While the ring 8 could be welded initially to either pipe section at the end thereof (initial welding preferably being done at the factory), in this instance I have shown the ring 8 welded to the bell, the bell having a radial outwardly projecting flange 9 upon which the outer edge of the ring is secured by welding material 10. Preferably ring 8 is of steel.

The inner edge of the ring 8 is of greater diameter than the end of the spigot 6 and the spigot is preferably reduced or beveled, as indicated at 11, so as to provide a clearance between it and the ring 8, permitting the introduction of the spigot for a short distance inside of the bell 5, as shown. To facilitate welding in the field of the inner edge of the ring 8 to the spigot, an annular shoulder 12 is provided and welding material 13 is so placed in the annular shoulder 12 as substantially to fill the space provided by said shoulder and thus be flush with the beveled surface 11. The welding material 13 and the welding material 10 are both preferably a hot working brass or a bronze of a type now on the market. The welding material 13 is also laid on at the factory, as is also a coating 14 of the same material, which preferably completely covers the exposed surfaces of the steel ring 8.

When the welded joint is to be completed in the field, the pipe sections are brought together, as shown in Fig. 1, with the inside edge of the ring 8 in contact or substantially in contact with the inner edge of the welding material 13 on the spigot. As the coating 14 of welded material extends to the inside edge of the ring 8, it follows that a joint is thus made between two surfaces of welding material. This facilitates making of the final weld, which is done by the workman in the field holding a pencil or stick of the welding material in one hand and a welding torch in the other hand, the welding material being rapidly melted by the torch and being spread until it completely fills the space between the shoulder 12 and the ring 8, as indicated at 15, Fig. 2. The welds 15 and 10 provide perfect seals, making possible the employment of the pipe joint in high pressure gas lines.

The completed pipe joint of Fig. 2 is flexible and resilient to a limited extent and thus has some of the characteristics of an expansion joint. It will be understood that the ring 8 is not welded or otherwise secured intermediately to the bell flange 9 and hence it is free to bend laterally responsive to stresses imposed upon it by relative movements between the pipe sections. These movements may be parallel to the longitudinal axis of the pipe or they may be lateral deflections. In either case, the relatively large area of the ring 8 which is unattached to either the bell or spigot permits the desired amount of relative movement without breaking the seal. The ring 8, if made of steel or other readily oxidized material, is protected from the weather by the coating 14 and hence no rust forms on its exposed surface which would prevent the making of a proper weld in the field until removed.

A very important feature of the present invention is the form of the ring 8. It has been found by extensive experimentation that the inner end 8ª of the ring should be considerably thicker than the intermediate portion. This prevents breaking of the joint at the inner edge of the ring. From the edge 8ª the ring tapers in thickness or, in other words, is of graduated thickness, the thinnest point being preferably at 8ᵇ. Beyond the thinnest point 8ᵇ the ring becomes somewhat thicker and in the preferred construction, it is curled or crimped over an annular bead 16 provided at the outer edge of the bell flange 9, thus being mechanically and permanently united to the bell flange independently of the weld 10.

After many experiments, I have discovered that the described ring will withstand a large number of rapidly repeated flexures without failure; and when failure finally occurs, it is likely to occur anywhere in the intermediate portion of the ring and never occurs at either weld. Thus the ring has no weak point. The ring is thicker where curled or crimped over the bell flange because it is desirable to prevent excessive bending adjacent the weld and to divert the bending to the intermediate portion, which is free of both the weld and the spigot, and also because a better weld is made if the steel ring is not too thin. A ring which is very thin at the weld will heat up so much more rapidly than the cast iron pipe that a good weld is most difficult to make.

Referring to Fig. 1, it will be seen that the annular beveled surface 11 of the spigot is tapered away from the inner annular surface of the ring 8. This is to make possible the uniting of the ring to the spigot even when the pipe sections are relatively deflected as much as 5 or 6°. It will be clear that due to this space the longitudinal axis of the spigot may be 5 or 6° out of alinement with the longitudinal axis of the bell and still a perfect weld may be made in the field without imposing undue strain on the ring 8.

The described construction is the preferred one because of its strength and ease of manufacture; but for certain work the modified form shown in Figs. 3 and 4 could be used. In this modification, instead of the pipe sections having a bell and spigot form, the two sections 20, 21 have plain ends and each has a ring 22 welded to the exterior thereof adjacent the end, as shown in Fig. 3, the weld being indicated at 23. Each ring 22 is of graduated thickness having a portion of least thickness at 22ª intermediate its ends and being of considerably greater thickness where united to the pipe by the weld 23. Each ring 22 has an outer edge 24 which is beveled, as shown, the two beveled edges providing a welding surface by which the two rings may be united and thus in turn unite the pipe sections 20 and 21. The field weld provides welding material 25 which is united to the beveled surfaces 24, as shown in Fig. 4.

It will be clear that the modified form of Figs. 3 and 4 is functionally similar to the form of the invention suggested above wherein the ring 8 is initially welded to the spigot and is secured to the bell flange by a weld made in the field. In each instance, the pipe sections are provided with radially projecting flanges united at their peripheries by a weld. The form of Figs. 3 and 4 differs from the one suggested above in that both flanges are alike and both have considerable resilience, due to the use of two flexible rings 22; but in the form employing a single ring 8 united to a heavy bell flange 9, the resiliency, and hence the flexibility, is entirely confined to the ring 8.

The form of Figs. 3 and 4 has many of the qualities of an expansion joint due to the relatively high resilience and flexibility of the united rings.

Obviously the present invention is not restricted to the particular embodiments thereof herein shown and described. Moreover, it is not indispensable that all the features of the invention be used conjointly, since they may be employed advantageously in various combinations and sub-combinations.

What I claim is:—

1. A bell and spigot pipe joint comprising, in combination, a bell having an outwardly projecting annular flange; a resilient metallic ring welded at its outer edge to the periphery of said flange, said ring being of least thickness between its inner and outer edges; and a spigot whose end is within the ring and which is welded to the inner portion of the ring; said ring being normally flat against the end of the bell and being unattached either to the bell or the spigot except by the two welds at its opposite edges.

2. A bell and spigot pipe joint comprising, in combination, a bell having an outwardly projecting annular flange; a resilient metallic ring welded at its outer edge to the periphery of said flange, said ring being of least thickness between its inner and outer edges, and being curled or crimped over the periphery of said flange; and a spigot whose end is within the ring and which is welded to the inner portion of the ring.

3. A bell and spigot pipe joint comprising, in combination, a bell having an outwardly projecting annular flange having an annular, radial bead; a resilient metallic ring welded at its outer edge to the periphery of said flange, said ring being of least thickness between its inner and outer edges, and being curled or crimped over and interlocked with said bead; and a spigot whose end is within the ring and which is welded to the inner portion of the ring.

4. A bell and spigot pipe joint comprising, in combination, a bell having an outwardly projecting annular flange having an annular, radial bead; a resilient metallic ring welded at its outer edge to the periphery of said flange, said ring being curled or crimped over and interlocked with said bead; and a spigot whose end is within the ring and which is welded to the inner portion of the ring.

5. A bell and spigot pipe joint comprising, in combination, a bell having an outwardly projecting annular flange having an annular, radial bead; a resilient metallic ring welded at its outer edge to the periphery of said flange, said ring being of least thickness between its inner and outer edges, and being curled or crimped over and interlocked with said bead; and a spigot whose end is within the ring and which is welded to the inner portion of the ring; the welding material substantially covering all the exposed surfaces of the ring and being of a non-rusting composition.

6. In a pipe joint, a pipe section having an enlarged, radially projecting end flange; a resilient metallic ring whose outer edge is bent over the outer surface of said end flange and is welded thereto; the other pipe section fitting inside the pipe section with the end flange; the inner edge of the ring being welded to the other pipe section; and a coating of welding metal of a non-rusting character completely covering all exposed outer surfaces of the ring.

JAMES R. McWANE.